United States Patent
Klinger et al.

(10) Patent No.: US 10,025,315 B2
(45) Date of Patent: Jul. 17, 2018

(54) UNMANNED OR OPTIONALLY MANNED VEHICLE, SYSTEM AND METHODS FOR DETERMINING POSITIONAL INFORMATION OF UNMANNED OR OPTIONALLY MANNED VEHICLES

(71) Applicant: Proxy Technologies, Inc., Reston, VA (US)

(72) Inventors: John Klinger, Reston, VA (US); Patrick C. Cesarano, Washington, DC (US)

(73) Assignee: PROXY TECHNOLOGIES, INC., Reston, VA (US)

( * ) Notice: Subject to any disclaimer, the term of this patent is extended or adjusted under 35 U.S.C. 154(b) by 0 days.

(21) Appl. No.: 15/206,191

(22) Filed: Jul. 8, 2016

(65) Prior Publication Data

US 2017/0227968 A1 Aug. 10, 2017

Related U.S. Application Data

(60) Provisional application No. 62/291,344, filed on Feb. 4, 2016.

(51) Int. Cl.
  *G05D 1/02* (2006.01)
  *G05D 1/00* (2006.01)

(52) U.S. Cl.
  CPC .......... *G05D 1/0214* (2013.01); *G05D 1/0022* (2013.01); *G05D 1/0027* (2013.01); *G05D 1/02* (2013.01); *G05D 1/0202* (2013.01); *G05D 1/0206* (2013.01); *G05D 1/0246* (2013.01); *G05D 1/0278* (2013.01)

(58) Field of Classification Search
  CPC ...... G05D 1/0214; G05D 1/0027; G05D 1/02; G05D 1/0206; G05D 1/0202; G05D 1/0246; G05D 1/0278; G05D 1/0022
  See application file for complete search history.

(56) References Cited

U.S. PATENT DOCUMENTS

| | | | | |
|---|---|---|---|---|
| 8,788,121 B2 * | 7/2014 | Klinger | ................. | G05D 1/104 701/3 |
| 8,874,360 B2 * | 10/2014 | Klinger | ................. | G08G 1/162 701/22 |
| 2007/0021879 A1 * | 1/2007 | DelNero | ............... | G05D 1/0088 701/23 |

(Continued)

*Primary Examiner* — Anne M Antonucci
(74) *Attorney, Agent, or Firm* — Kenealy Vaidya LLP

(57) ABSTRACT

Some embodiments are directed to an unmanned vehicle for use with a companion unmanned vehicle. The unmanned vehicle includes a location unit that is configured to determine a current position of the unmanned vehicle. The unmanned vehicle includes a path planning unit that generates a planned path. The unmanned vehicle receives a planned path of the companion unmanned vehicle and a current position of the companion unmanned vehicle. The unmanned vehicle includes a position unit that is configured to determine a relative position between the unmanned vehicle and the companion unmanned vehicle based on at least the planned paths and the current positions of the unmanned vehicle and the companion unmanned vehicle. The unmanned vehicle also includes a control unit that is configured to control a movement of the unmanned vehicle based on at least the relative position between the unmanned vehicle and the companion unmanned vehicle.

18 Claims, 8 Drawing Sheets

(56) References Cited

U.S. PATENT DOCUMENTS

| | | | | |
|---|---|---|---|---|
| 2010/0114633 | A1* | 5/2010 | Sislak | G06Q 10/047 701/120 |
| 2013/0238170 | A1* | 9/2013 | Klinger | G05D 1/104 701/3 |
| 2013/0325210 | A1* | 12/2013 | Palm | G05D 1/0289 701/2 |
| 2014/0081505 | A1* | 3/2014 | Klinger | G08G 1/162 701/25 |

* cited by examiner

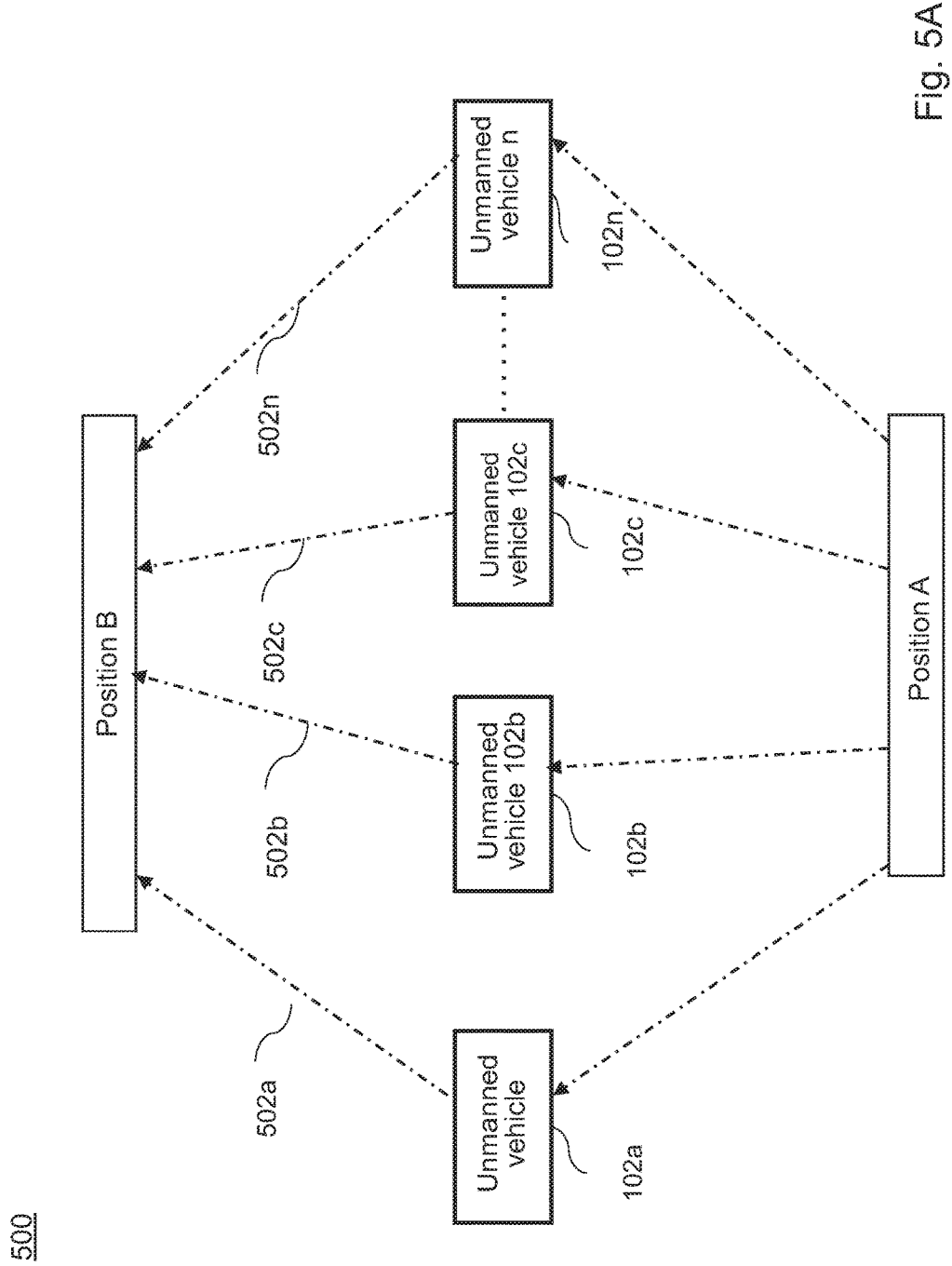

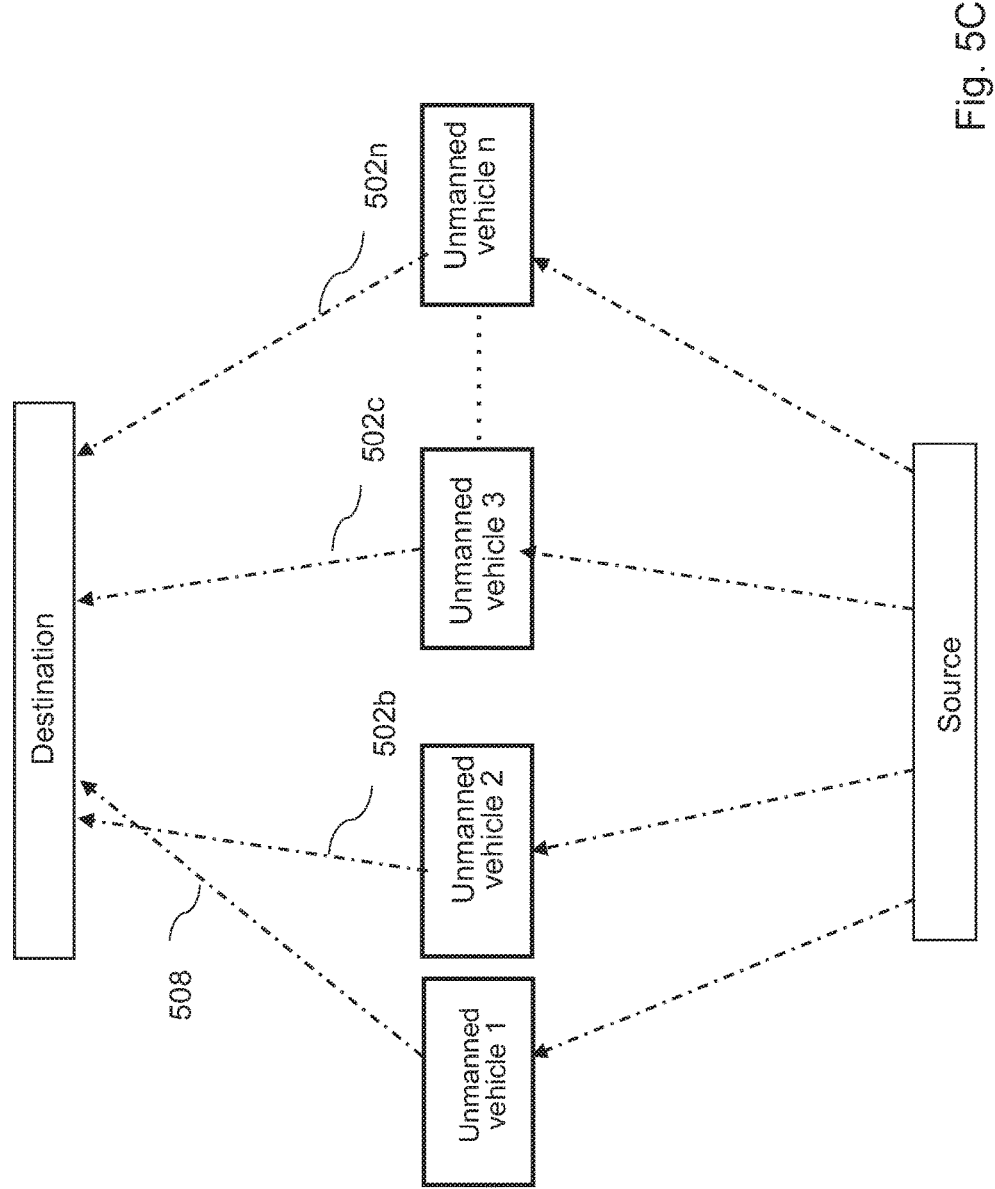

US 10,025,315 B2

UNMANNED OR OPTIONALLY MANNED VEHICLE, SYSTEM AND METHODS FOR DETERMINING POSITIONAL INFORMATION OF UNMANNED OR OPTIONALLY MANNED VEHICLES

PRIORITY INFORMATION

This application claims priority to provisional Application 62/291,344 filed on Feb. 4, 2016. The substance of Application 62/291,344 is hereby incorporated in its entirety into this application.

BACKGROUND

The disclosed subject matter relates to unmanned vehicles or optionally manned vehicles, systems and methods for controlling unmanned vehicles or optionally manned vehicles. More particularly, the disclosed subject matter relates to systems and methods for estimating distance between unmanned vehicles or optionally unmanned vehicles; and systems and methods for estimating distance between unmanned or optionally manned vehicles, and obstacles.

An unmanned vehicle is a vehicle without a person on board, which is capable of sensing its surroundings and navigating on its own. The unmanned vehicle can operate in, but not restricted to air, water, land, and so forth. The unmanned vehicle can either be autonomous or remotely operated by an operator.

Optionally manned vehicles can be operated with or without a person on board. Optionally manned vehicles may enable manual testing of the vehicles before unmanned operation or allow manual control, if necessary, during an unmanned mode of operation.

Generally, unmanned vehicles are vulnerable to collisions with each other, and/or with obstacles present in their operational environments. These collisions may result from a lack of geographic information of the given obstacle and/or unpredictable environmental conditions. Further, a group of two or more unmanned vehicles may have increased likelihood of such collisions as each unmanned vehicle may be subject to similar changes in environmental conditions.

SUMMARY

Unmanned vehicles are naturally in jeopardy of colliding with each other (vehicle-to-vehicle collisions) and/or with obstacles present in their operational environments. For example, a single unmanned aerial vehicle on its course can collide with known structures, such as, but not restricted to, buildings, antennas, terrain, and the like. Further, a single unmanned terrestrial, aquatic, oceanic or space vehicle can suffer similar collisions with structures, such as, but not restricted to, trees, rocks, bodies of water, sand banks, coral, orbital debris, and so forth.

Such vehicle-to-vehicle collisions and/or collisions between unmanned vehicles and obstacles may result from lack of geographic information of the obstacles or due to change in environmental conditions, such as, but not restricted to, change in wind patterns, rain, snow, and the like. These may cause the unmanned vehicles to unpredictably veer off-course and lead to aforementioned collisions.

Further, a fleet of unmanned vehicles may face increased possibilities of such collisions as each unmanned vehicle is subject to similar unpredictable changes in their operational environments.

Optionally manned vehicles can face similar problems as described above with reference to unmanned vehicles. Specifically, optionally manned vehicles can suffer from collisions with each other or with obstacles during an unmanned mode of operation.

Some related arts mitigate vehicle-to-vehicle collisions by providing data to a first unmanned vehicle, the data including planned paths of other unmanned vehicles in the fleet. This planned path information helps in estimating positions of the other unmanned vehicle relative to the first unmanned vehicle. These estimations of the positions of the unmanned vehicles may enable suitable modifications in the trajectories of one or more unmanned vehicles. However, this approach involves the assumption that each unmanned vehicle is presently on its course, and therefore corresponding estimations of the relative positions of the unmanned vehicles may be inaccurate. For example, there may be a possibility that one or more of the unmanned vehicles may be off-course due to any unforeseen circumstances, such as, but not limited to, environmental conditions, hardware or software faults, etc., and therefore, estimation of the relative positions may be inaccurate. Such inaccurate estimation may result in vehicle-to-vehicle collisions.

It may therefore be beneficial to provide an unmanned vehicle with the planned path data of each of the other unmanned vehicles and the corresponding current position data. For the current position data, the unmanned vehicles can use a range of sources, such as, but not restricted to, GPS system, relative vehicle telemetry data, terrain data, ranging tones, optical devices (cameras, stereoscopy, holography etc.), ad-hoc peer-to-peer communication between the unmanned vehicles, and so forth.

It may therefore be beneficial to provide an optionally manned vehicle with the planned path data of each of the unmanned vehicles and the corresponding current position data. Optionally manned vehicles may use a range of sources similar to the ones described above with respect to unmanned vehicles for determining the current position data.

It may therefore be beneficial to provide an unmanned vehicle, a system and a method to maintain coordination among unmanned vehicles in a fleet by sharing their planned path data and their current position data among each other, so that it is possible to get better estimation of distances between the unmanned vehicles.

It may therefore be beneficial to provide an unmanned vehicle, a system and a method of maintaining coordination among unmanned vehicles in a fleet by providing path and current position data to at least one of the unmanned vehicles, thereby improving the estimation of distances between individual unmanned vehicles and their environment.

It may therefore be beneficial to provide an unmanned vehicle, a system and a method of controlling unmanned vehicles to impede collisions between the unmanned vehicles and/or between the unmanned vehicles and obstacles, thereby reducing or eliminating losses due to damage to the unmanned vehicles suffering from collisions.

Some embodiments are therefore directed to a method of controlling multiple unmanned vehicles, each unmanned vehicle being operatively coupled to a controller. The method can include receiving, at the controller, a planned path of each unmanned vehicle and a current position of each unmanned vehicle; determining, by the controller, relative positions of the unmanned vehicles with respect to each other based on the planned path and current position of each unmanned vehicle; and controlling, by the controller, a movement of each unmanned vehicle based on at least the relative positions of the unmanned vehicles.

Some other embodiments are directed to an unmanned vehicle for use with a companion unmanned vehicle, the unmanned vehicle including a location unit that is configured to determine a current position of the unmanned vehicle; a path planning unit that is configured to generate a planned path of the unmanned vehicle; a communication unit that is configured to wirelessly communicate with the companion unmanned vehicle, the communication unit further configured to receive a planned path of the companion unmanned vehicle and a current position of the companion unmanned vehicle; a position unit that is configured to determine a relative position between the unmanned vehicle and the companion unmanned vehicle based on at least the planned path of the unmanned vehicle, the planned path of the companion unmanned vehicle, the current position of the unmanned vehicle, and the current position of the companion unmanned vehicle; and a control unit that is configured to control a movement of the unmanned vehicle based on at least the relative position between the unmanned vehicle and the companion unmanned vehicle.

Yet other embodiments are directed to a system including multiple unmanned vehicles spaced from each other. The system including the unmanned vehicles, wherein each of the unmanned vehicles can include a location unit that is configured to determine a current position of the unmanned vehicle. The system including the unmanned vehicles, wherein each of the unmanned vehicles can include a path planning unit that is configured to generate a planned path of the unmanned vehicle. The system including the unmanned vehicles, the system can include a controller disposed in communication with the unmanned vehicles. The controller is configured to receive the planned path and the current position of each of the unmanned vehicles; determine relative positions of the unmanned vehicles with respect to each other based on the planned path and the current position of each of the unmanned vehicles; and control a movement of the corresponding unmanned vehicle based on at least the relative positions of the unmanned vehicles.

Some other embodiments are also directed towards a system including multiple optionally manned vehicles and a controller operatively coupled to each of the optionally manned vehicles. Each of the optionally manned vehicles communicates its planned path and its current position with the controller. The controller is configured to determine relative positions of the optionally manned vehicles with respect to each other based on the planned path and the current position of each of the optionally manned vehicle. The controller is further configured to control the movements of the optionally manned vehicles based on their relative positions in order to impede or prevent collisions between them and/or collisions between the optionally unmanned vehicles and one or more obstacles.

As mentioned above, current related art technologies either do not share, or share only in a limited portion their positions, paths, and/or calculated future positions and/or trajectories. This can limit the ability of an unmanned or optionally manned vehicle to accurately predict the estimated path of a neighboring vehicle, leading to potential collisions, etc.

Some of the disclosed embodiments address this problem by performing full planned path analyses individually, and sharing each planned path with one or more of its neighboring vehicles. For example, rather than simply informing a neighboring vehicle of the vehicle's position, it may relate speed, altitude, velocity, etc. More importantly, however, is that the vehicle could relate a fully calculated path trajectory (such as a spline, parametric vector, or any other means of relating the objective trajectory). This information can allow the vehicles to fully re-calculate their individual planned paths, or to perturbatively adjust their own planned paths incrementally as their neighbors' paths deviate or are updated for any number of reasons.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 5A is a schematic of unmanned vehicles travelling along planned paths in accordance with disclosed subject matter.

FIG. 5C is a schematic of unmanned vehicles detecting a potential collision in accordance with disclosed subject matter.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Unmanned Vehicle

Figure 1:
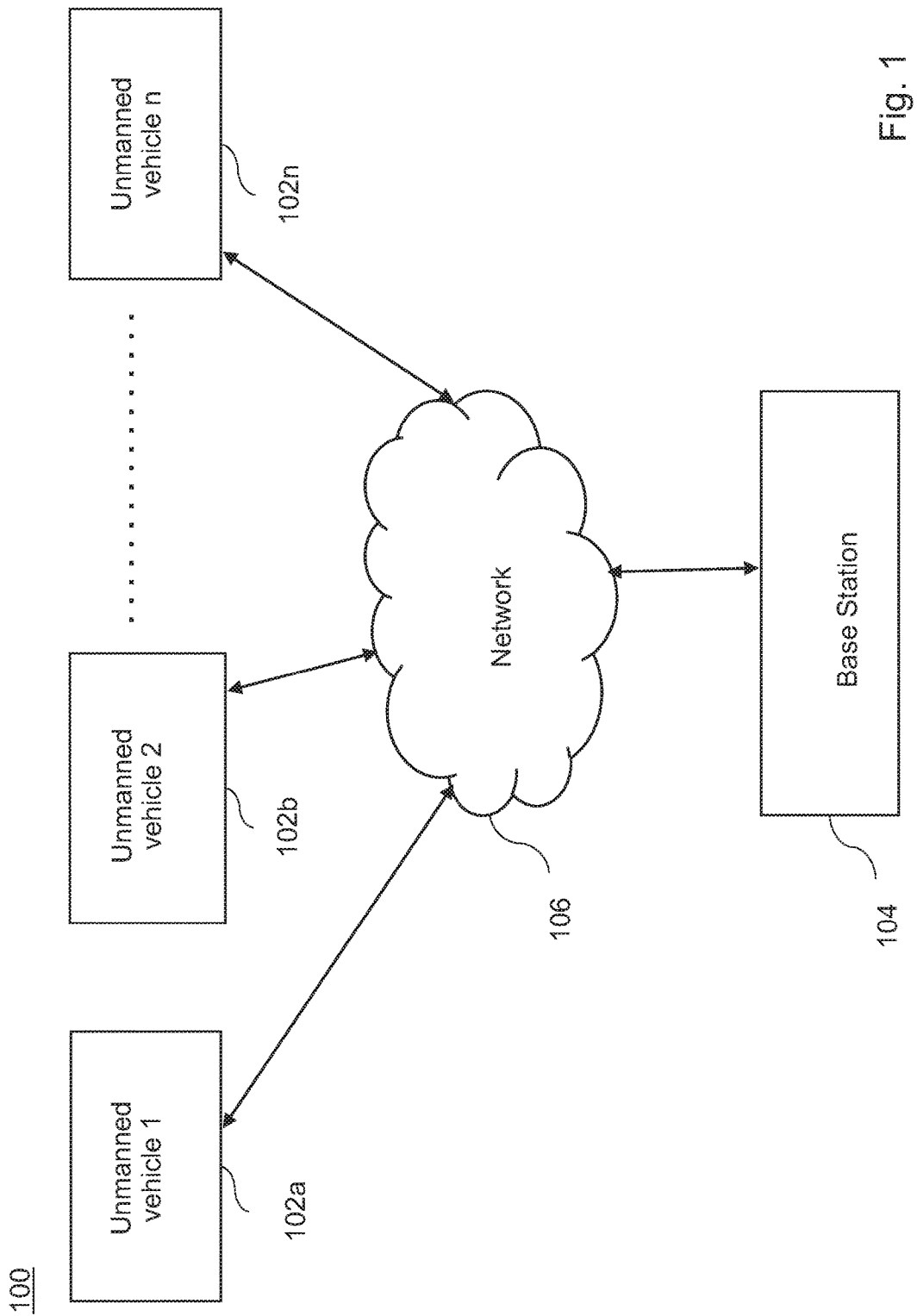
FIG. 1 is an exemplary system of unmanned vehicles in accordance with the disclosed subject matter.

FIG. 1 is an exemplary system 100 of unmanned vehicles, in accordance with the disclosed subject matter.

FIG. 1 illustrates the system 100 that includes unmanned vehicles 102*a-n*, hereinafter referred to as an unmanned vehicle 102. The unmanned vehicle 102, and embodiments are intended to include or otherwise cover any type of unmanned vehicle, including an unmanned aerial vehicle, an unmanned terrestrial vehicle, a drone, a gyrocopter, an unmanned oceanic vehicle, etc. In fact, embodiments are intended to include or otherwise cover any type of unmanned vehicle that may stay geostationary in the sky and also fly at a considerable height. The unmanned vehicle 102 is merely provided for exemplary purposes, and the various inventive aspects are intended to be applied to any type of unmanned vehicle. In alternative embodiments, the system 100 can include one or more optionally unmanned vehicles.

In some embodiments, the unmanned vehicle 102 can be optionally controlled by an operator present at a base station 104. In some other embodiments, the unmanned vehicle 102 may be autonomously controlled based on a predetermined control strategy. In yet other embodiments, the unmanned vehicle 102 may be semi-autonomously controlled, which involves an operator entering and/or selecting one or more attributes and subsequent autonomous control of the unmanned vehicles 102 based on the entered and/or selected parameters. In fact, embodiments are intended to include or otherwise cover any type of techniques, including known, related art, and/or later developed technologies to control the unmanned vehicle 102.

For operating purposes, the unmanned vehicle 102 and its components (not shown) can be powered by a power source to provide propulsion. The power source can be, but not restricted to, a battery, a fuel cell, a photovoltaic cell, a combustion engine, fossil fuel, solar energy, and so forth. In fact, embodiments are intended to include or otherwise cover any type of power source to provide power to the unmanned vehicle 102 for its operations.

In some embodiments, the unmanned vehicle 102 can have, but not restricted to, rotors, propellers, and flight control surfaces that control movements and/or orientation of the unmanned vehicle 102, and the like. In fact, embodiments are intended to include or otherwise cover any other component that may be beneficial to control the unmanned vehicle 102.

Further, in some embodiments, the unmanned vehicle 102 can also include, but not restricted to, a processor (not shown), a memory (not shown), and the like. In some embodiments, the processor of the unmanned vehicle 102 can be a single core processor. In alternate embodiments, the processor can be a multi-core processor. Embodiments are intended to include or otherwise cover any type of processor, including known, related art, and/or later developed technologies to enhance capabilities of processing data and/or instructions. The memory can be used to store instructions that can be processed by the processor. Embodiments are intended to include or otherwise cover any type of memory, including known, related art, and/or later developed technologies to enhance capabilities of storing data and/or instructions.

In an embodiment, the system 100 including the unmanned vehicles 102a to 102n may be a fleet of unmanned vehicles that may execute a mission in a coordinated manner. The mission may involve flight between two positions, carrying a payload to a destination, surveillance or surveying of an area, tracking a target, and so forth. Therefore, each of the unmanned vehicle 102 in the system 100 may be a companion unmanned vehicle of the other unmanned vehicles 102.

In the exemplary system 100 as shown in FIG. 1, a planned path is generated for each of the unmanned vehicles, based on one or more parameters, such as, but not restricted to, a starting position, a destination, mission requirements (surveillance, tracking etc.), no-fly zones, power consumption, travel time, fuel availability, efficiency, stealth, wind speeds and direction, and so forth.

The planned path can include a series of positions, speeds, altitudes, headings or orientations, and the like. Further, each position may be linked to a corresponding speed, altitude and heading. A first position in the series may be the source, while last position may be the destination.

In an example, the starting position may be position "A" (shown in FIG. 5A), while the destination may be position "B" (shown in FIG. 5A). In some cases, the mission may involve a round trip, and therefore, position "A" may coincide with position "B". The planned path for the unmanned vehicle 102 may be an optimal path between positions "A" and "B" in terms of travel time, power requirements, collision avoidance, jurisdictional requirements, mission requirements, weather etc. The planned paths may also be segmented, such as a first planned path from position "A" to site 1 (not shown), a second planned path from site 1 to site 2 (not shown), and a third planned path from site 2 to position "B".

In case the mission is executed as planned, the unmanned vehicle 102 follows the corresponding planned paths during the mission. However, one or more of the unmanned vehicles 102 may go off course due to various reasons. In one exemplary scenario, the unmanned vehicle 102 may determine that the original planned path is optimal, but it has gone slightly off course within some threshold of position, speed or any other parameter, and needs to devise an intermediate planned path to bridge the gap between its current position and the original planned path. In another scenario, the vehicle may calculate a new planned path distinct from the original planned path, for example, if the unmanned vehicle is massively off course and it is difficult to return to the original planned path. However, calculating a new planned path expends substantial computational resources and time. For example, in case of a fleet, such as the system 100 illustrated in FIG. 1, if the unmanned vehicle 102a re-calculates a new planned path, one or more of the companion unmanned vehicles 102b to 102n may also need to calculate a new planned path even if the companion unmanned vehicles 102b to 102n are not off course in order to adapt to the new planned path of the unmanned vehicle 102a. Thus, it may be preferable for each unmanned vehicle 102 to follow its original planned path and, if necessary, make minor corrections in case the unmanned vehicle 102 goes off course from the planned path instead of re-calculating a new planned path.

In some embodiments, the base station 104 transmits data required to generate the planned path for each of the unmanned vehicles 102, and each of the unmanned vehicles 102 generates a planned path of its own based on the data provided by the base station 102. The unmanned vehicle 102a can transmit its planned path data to the other unmanned vehicles 102b to 102n. This can enable the other unmanned vehicles 102b to 102n to consider the planned path of the unmanned vehicle 102a while generating their respective planned paths, thereby enhancing cooperation, and avoiding or impeding close encounters or collisions. Close encounters can include situations where a distance between two unmanned vehicles 102 is less than a safe distance.

In other embodiments, the base station 104 can generate the planned path of each of the unmanned vehicles 102 and transmit the planned paths to each of the unmanned vehicles 102 with their own planned path data and planned path data of the other unmanned vehicles 102 in the fleet in order to impede or avoid future collisions.

In some embodiments, each of the unmanned vehicles 102 can generate a new planned path. Various factors, such as, but not restricted to, wind, rain, other environmental factors, and/or equipment faults may cause the vehicle to veer off its planned path. In such situations, the vehicle may generate a new planned path or modify the original planned path so as to effectively accomplish the mission requirements and/or enhance cooperation between the companion unmanned vehicles 102. A further instance where it may be beneficial for the unmanned vehicle 102 to recalculate its planned path is where there is a change in mission requirements or certain mission objectives have been accomplished or have become unnecessary. Additional examples of events which may cause the unmanned vehicle 102 to generate a new planned path include the unmanned vehicle 102 being close to the end of its current path, the unmanned vehicle 102 detecting a close encounter or possible collision with a companion unmanned vehicle 102, and any change in coordination parameters between the unmanned vehicles 102 in the system 100. Such coordination parameters may include designating one of the unmanned vehicles 102 in the system 100 as a team leader and the other unmanned vehicles 102 as followers. In case the unmanned vehicle 102 designated as the team leader generates a new planned path, the other unmanned vehicles 102 may also generate corresponding new paths.

The unmanned vehicle 102 may then be equipped with the knowledge of its own planned path and the planned path data of the other unmanned vehicles 102 in the system 100. Therefore, each unmanned vehicle 102 in the system 100 can determine a possibility of a close encounter or a collision. After generating its own planned path, an unmanned vehicle 102 can, for example, compare its planned path to the planned paths of the other unmanned vehicles 102 in order to determine whether a close encounter or a collision is likely to occur. If the unmanned vehicle 102 does not detect a potential close encounter or a collision, it will continue to travel along its planned path. If, on the other hand, a close encounter or a collision is detected, a corrective action can be taken which is not disruptive to the mission of the unmanned vehicles 102. Only one of the unmanned vehicles 102 may need to adjust its planned path in order to avoid a close encounter or a collision with another unmanned vehicle 102. The unmanned vehicle 102 may make adjustments, such as, but not restricted to, a temporary speed adjustment, a temporary altitude adjustment, an evasive horizontal profile adjustment, and so forth.

In order to optimize cooperation between the unmanned vehicles 102, the planned path data includes sufficient data for a recipient of the planned path data to determine the expected future position of the unmanned vehicle 102 that transmitted the planned path data. In an embodiment, the data, which enables the determination of the expected future position of any one of the unmanned vehicles 102, can include, but not restricted to, an absolute time at the start of the planned path, a flight time specified by the path, data to determine a speed profile of the path, data to determine an altitude profile of the path, data to determine a horizontal (i.e. a top view) profile of the path, data to determine a heading along the path, and so forth. The horizontal location (i.e., latitude and longitude) of the unmanned vehicle 102 at any horizontal distance in the path can be determined using this data. Further, data to determine the altitude profile can include, but not restricted to, an initial altitude of the path, a climb slope used for climb operations, a descent slope used for descent operations, and the like. The altitude of the unmanned vehicle 102 at any horizontal distance into the path may be determined using the aforementioned data.

Further, each of the unmanned vehicles 102 may also determine its current position data. The current position can include various parameters, such as, but not restricted to, a current location, a current altitude, a current speed and a current heading or orientation. The current location may include a latitude and a longitude of the unmanned vehicle 102. Moreover, each of the unmanned vehicles 102 may communicate its current position, through a communication network 106, to the base station 104.

Each of the unmanned vehicle 102 may be further configured to communicate with the other companion unmanned vehicles 102. In some embodiments, the unmanned vehicle 102 may communicate with other companion unmanned vehicles 102 through, but not restricted to, a communication network such as the communication network 106 of the system 100.

In some other embodiments, the communication network 106 may include a data network such as, but not restricted to, the Internet, local area network (LAN), wide area network (WAN), metropolitan area network (MAN), etc. In certain embodiments, the communication network 106 can include a wireless network, such as, but not restricted to, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS) etc. In some embodiments, the communication network 106 may include or otherwise cover networks or subnetworks, each of which may include, for example, a wired or wireless data pathway. The communication network 106 may include a circuit-switched voice network, a packet-switched data network, or any other network capable for carrying electronic communications. For example, the network may include networks based on the Internet protocol (IP) or asynchronous transfer mode (ATM), and may support voice usage, for example, VoIP, Voice-over-ATM, or other comparable protocols used for voice data communications. In one implementation, the network includes a cellular telephone network configured to enable exchange of text or SMS messages.

Examples of the communication network 106 may also include, but not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth. Embodiments are intended to include or otherwise cover any type of communication network, including known, related art, and/or later developed technologies to communicate with other unmanned vehicles 102 or the base station.

Moreover, the base station 104 can be a fixed base station or a mobile base station. In some other embodiments, the mobile base station may include, but not restricted to, an unmanned aerial vehicle, an unmanned terrestrial vehicle, and the like. It may also be contemplated that the base station 104 may be, but not restricted to, an electronic device, such as a smartphone, a laptop, a remote control device, and the like. In fact, embodiments are intended to include or otherwise cover any type of base station, including known, related art, and/or later developed technologies to communicate with the unmanned vehicles 102.

Further, the functioning of the unmanned vehicle 102 is described in more detail below in conjunction with FIG. 2.

II. Functioning of the Unmanned Vehicle

Figure 2:
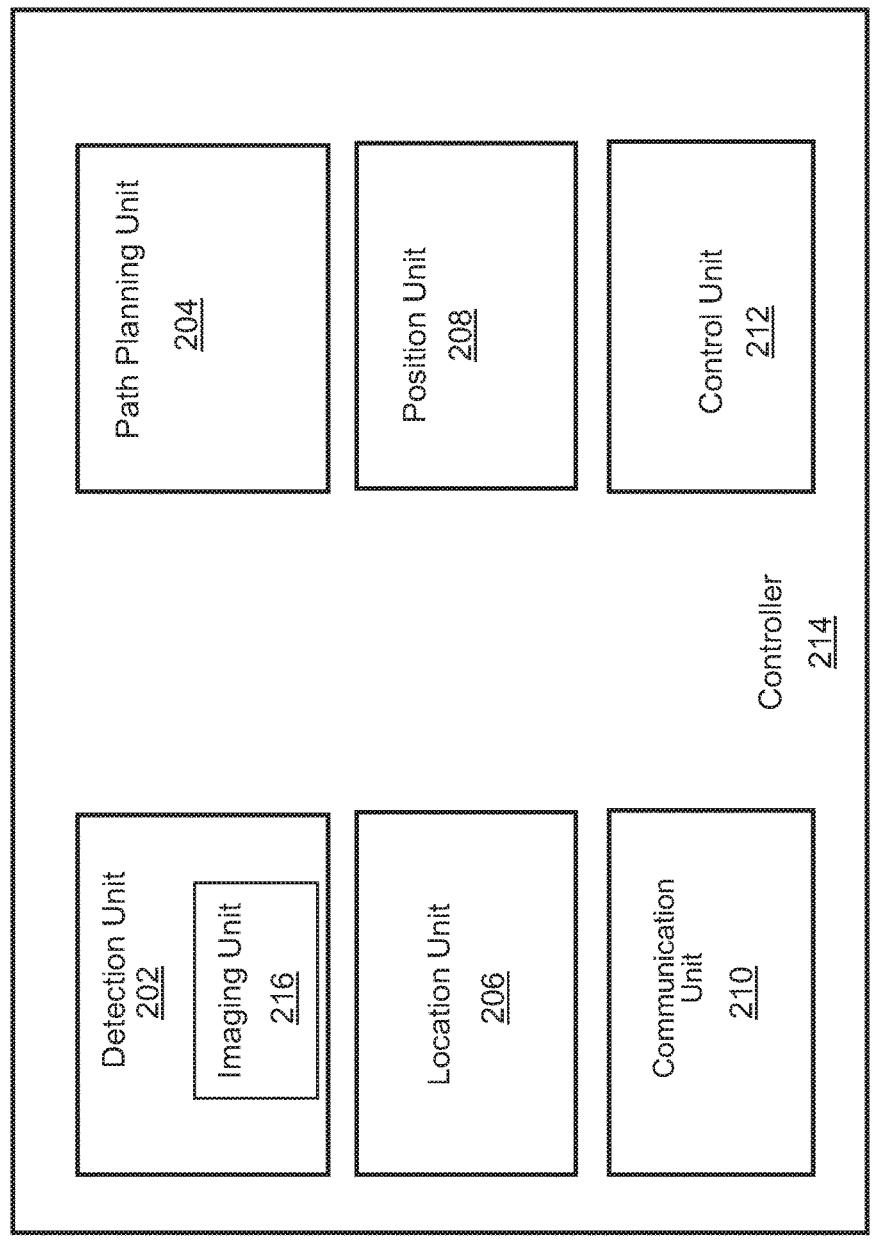
FIG. 2 illustrates components of the unmanned vehicle in accordance with the disclosed subject matter.

FIG. 2 illustrates components of each of the unmanned vehicles 102, in accordance with the disclosed subject matter.

In some embodiments, the unmanned vehicle 102 can include, but not restricted to, a detection unit 202, a path planning unit 204, a location unit 206, a position unit 208, a communication unit 210, and a control unit 212. In fact, embodiments of the disclosed subject matter are intended to include or otherwise cover any number of components in the unmanned vehicle 102 to control the unmanned vehicle 102 in a planned way.

In some embodiments, the unmanned vehicle 102 can have a controller 214 which includes, but not restricted to, the detection unit 202, the path planning unit 204, the location unit 206, the position unit 208, the communication unit 210, and the control unit 212. The controller 214 controls various operations of the unmanned vehicle 102 including, but not limited to, a movement of the unmanned vehicle 102, controlling and coordinating operations of various components of the unmanned vehicle 102, interfacing with other unmanned vehicles 102 and processing information from the base station 104. In fact, embodiments of the disclosed subject matter are intended to include or otherwise cover any type of controller, including known, related art, and/or later developed technologies to control the unmanned vehicle 102.

In some other embodiments, the base station 104 has a controller (not shown), that receives and transmits planned path data and current position data to the unmanned vehicles 102. The controller of the base station 104 may also perform other operations, such as, remotely controlling one or more unmanned vehicles 102, enhancing coordination between the unmanned vehicles 102 of the system 100, and so forth.

In some embodiments, the detection unit 202 has an imaging unit 216 that can be configured to capture images of obstacles and terrain. For example, the imaging unit 216 may capture images of a building from various perspectives. In some other embodiments, the imaging unit 216 can be configured to capture videos and/or motion images of the obstacles. In fact, embodiments of the disclosed subject matter are intended to include or otherwise cover any type of imaging unit 216, including known, related art, and/or later developed technologies to capture images and/or videos.

In some embodiments, the detection unit 202 can be configured to generate stereoscopic images by using the captured images of, but not restricted to, obstacles, terrain, and the like. The detection unit 202 may use various stereoscopic photographic techniques that uses the captured images to generate the stereoscopic images. The images, that are captured from slightly different angle by the unmanned vehicle 102, are combined to generate stereoscopic images to provide spatial depth and dimension. In some embodiments, the stereoscopic images can be three dimensional (3D) images.

In addition, the detection unit 202 can include, but not restricted to, infrared detectors, RADAR, object sensors, proximity sensors, and the like. The detection unit 202 can be configured to detect another unmanned vehicle or fleets which are not a part of the network and can essentially be considered as a hazard, and each of the unmanned vehicles 102 can act accordingly to divert its course while maintaining the same planned path strategies within a given fleet to avoid or impede inter-fleet collisions. In some embodiments, the detection unit 202 can be configured to detect and/or determine the structural parameters of the obstacle. The structural parameters may be, but not restricted to, height, width, length and so forth, of an obstacle.

Further, the path planning unit 204 can be configured to generate a planned path of the unmanned vehicle 102 by using data received from the base station 104. The planned path data received from the base station 104 may include, but not restricted to, a speed profile of the unmanned vehicle, an altitude profile of the path, a horizontal profile of the path, time of flight, a target and/or destination, and the like.

In some embodiments, the location unit 206 can be configured to determine current position data of the unmanned vehicle 102. In some embodiments, the location unit 206 determines the current position by various methods, including, but not limited to, satellite navigation, relative vehicle telemetry, optical imaging, ranging tones, ad-hoc peer-to-peer communication between the unmanned vehicles 102, terrain data in conjunction with vehicle elevation data, inertial navigation, or a combination thereof. Terrain data may be obtained from various sources, such as United States Geological Survey (USGS). The current position data may include various parameters, but not restricted to, current latitude, current longitude, and current altitude. The current position data can additionally include current heading, current speed, yaw angle and/or velocity, pitch angle and/or velocity, roll angle and/or velocity etc. In fact, the current position data is intended to include or otherwise cover any type data that is required to determine the current position of the unmanned vehicle 102.

In some embodiments, the location unit 206 may include one or more devices, including, but not limited to, a satellite navigation module, such as a Global Positioning System (GPS), an inertial navigation unit, and the like to determine the current position of the unmanned vehicle 102. In fact, embodiments of the disclosed subject matter are intended to or otherwise include any type of devices to determine current position of the unmanned vehicle 102. In an embodiment, the inertial navigation unit may include one or more accelerometers and gyroscopes for determining the current position including the heading based on acceleration values measured in different axes.

In some embodiments, the location unit 206 can also determine the current position of the unmanned vehicle 102 based on signals from the imaging unit 216. In an example, the location unit 206 may compare images of a landmark (not shown) in the planned path of the unmanned vehicle 102 with the images captured by the imaging unit 216 and determine the current position of the unmanned vehicle 102. A position of the landmark may be predetermined and included in the planned path data. Further, the images of the landmark may be stored in the memory associated with the unmanned vehicle 102.

In some embodiments, the position unit 208 can be configured to determine a relative position of the unmanned vehicle 102 with respect to the other unmanned vehicles 102 of the system 100. The position unit 208 may use the determined current position data of the unmanned vehicles 102 in order to calculate relative position of the unmanned vehicle 102. In some embodiments, the position unit 208 of the unmanned vehicle 102 can determine a relative orientation of the unmanned vehicle 102 with respect to the other unmanned vehicles of the system 100. In other embodiments, the position unit 208 and the location unit 206 may coordinate with each other to determine the relative position of the unmanned vehicle 102 with respect to the other unmanned vehicles 102. The position unit 208 can further determine relative distance between the unmanned vehicle 102 and the other unmanned vehicles 102 of the system 100. In an embodiment, the relative positions of the unmanned vehicles 102 can include relative distances between the unmanned vehicles 102 and relative orientations between the unmanned vehicles 102. In further embodiments, the position unit 208 may estimate potential collisions or close encounters of the unmanned vehicle 102 with the other unmanned vehicles 102 and/or obstacles.

In some embodiments, the relative distance between two unmanned vehicles 102 may be the distance between the two unmanned vehicles 102 in one or more axes. In some other embodiments, the relative distance can be the difference in altitudes of each of the unmanned vehicles. In yet some other embodiments, the relative distance can be the difference between their horizontal profiles in one or more axes.

In an embodiment, the relative orientation between two unmanned vehicles 102 can be the angular difference between their headings. Alternatively, the relative distance can be the difference between the angular orientations of the two unmanned vehicles 102 about one or more axes. Further, in some other embodiments, relative orientation can be the difference between roll angles, pitch angles and/or yaw angles.

In some embodiments, the location unit 206 can use ranging tones to determine current position of the unmanned vehicle 102. Ranging tones (also known as "maximal codes" or "optimal codes") are long sequences of bits that may be generated by Linear Feedback Shift Registers (LFSR's). Ranging tones are pseudo-random, and resemble white noise unless the pattern is known beforehand. Ranging tones have cyclical patterns or codes, and are based on configurations of the LFSR's and their initial values. Ranging tones may include hundreds, thousands, or more bits and appear to be random, which may prevent the ranging tones from interfering in any appreciable way with local wireless traffic. However, by knowing the cyclic code, identification of a code transmitted to a companion unmanned vehicle 102 which relays the code signal back, is possible. Even though the sequence of bits received from the companion unmanned vehicle 102 appears random, the chances of the code being actual noise are almost negligible because of the precise cyclical nature of the code. For example, the code can be 1, 2, 3, 4, 1, 2, 3, 4 and so on. If the same code is received, it is a result from the first transmission of this code. In some embodiments, the location unit 206 may use the communication unit 210 for transmission of the code and reception of the code from the companion unmanned vehicle 102. Therefore, the method of ranging tones basically involve applying the principle of echolocation on pseudo-random digital signals.

Upon receiving the code via the communication unit 210, the position unit 208 in coordination with the location unit 206, may use various parameters, such as, the speed of light, and a time required to receive the code starting from the time of transmission, in order to determine a distance travelled in the interim. The position unit 208 may further use the altitudes of both unmanned vehicles 102, and the time taken by a ranging tone to reach the unmanned vehicle 102, in order to determine a relative distance between the unmanned vehicle 102 and the companion unmanned vehicle.

The unmanned vehicle 102 in coordination with the companion unmanned vehicle 102 may implement alternative schemes to determine relative position based on ranging tones. In an embodiment, the companion unmanned vehicle 102 can transmit the received code after a predetermined delay. The predetermined delay may be based on a time required for the companion unmanned vehicle 102 to process and relay the received code. In an example, the companion unmanned vehicle 102 may require 100 ms to process and relay the received code. Therefore, the predetermined delay may be 200 ms to ensure completion of the processing and relay of the code. Further, the position unit 208 can determine the distance between the unmanned vehicle 102 and the companion unmanned vehicle 102 based on the time between transmission and reception of the code, the predetermined delay and speed of light. In the present example, the position unit 208 may deduct 200 ms (the predetermined delay) from the total time between transmission and reception to determine the time required for the code to travel to and from the companion unmanned vehicle 102. Therefore, the distance can be calculated based on half of the travel time of the code and speed of light.

In some other embodiments, the location unit 206 can use relative vehicle telemetry to determine the current position of the unmanned vehicle 102. For example, the unmanned vehicle 102 and a companion unmanned vehicle 102 may share their respective altitude values (based on altimeter measurements) in order to determine a difference is elevation between them. Relative vehicle telemetry in conjunction with ranging tones can be used to precisely determine relative distance and elevation between the unmanned vehicle 102 and the companion unmanned vehicle 102. Specifically, relative vehicle telemetry and ranging tones enable the position unit 208 to determine all sides and angles of an imaginary right triangle formed between the unmanned vehicle 102 and the companion unmanned vehicle 102 in three-dimensional space. For example, the difference in elevation may form an "opposite" side of the right triangle. Exchange and processing of ranging tone may provide the "hypotenuse" of the right triangle. From this information, the "adjacent" side and all internal angles of the right triangle can be deduced, and thus relative vehicle distances can be calculated. However, various other parameters or data, such as, but not restricted to, pictures, video, acoustics, pressure, temperature, time, yaw, pitch, roll can be a part of the telemetry data shared between the unmanned vehicle 102 and the companion unmanned vehicle 102.

In yet some other embodiments, the position unit 208 in coordination with the location unit 206 can use ad-hoc peer-to-peer communication (point-to-point communication), to directly send and/or receive any information to and/or from the companion unmanned vehicle 102, rather than communicating information through an intermediary, such as, but not restricted to, the base station 104, a third unmanned vehicle, and the like. The information that can be sent or received via peer-to-peer communication network can be, but not restricted to, a planned path data, telemetry data, and the like.

In some embodiments, the location unit 206 can use US Geological Survey (USGS) terrain data in conjunction with vehicle elevation data to determine current vehicle position. Terrain data can be used to generate a 3-D map for the unmanned vehicle 102. The unmanned vehicle 102 can use a combination of, but not restricted to, GPS data, vehicle telemetry data and terrain data, to determine a planned path beforehand. For example, if one or more unmanned vehicles 102 are attempting to fly close to the ground, it would be important to know that a mountain or a hill is fast approaching, as it requires some time to modify the planned path of a moving unmanned vehicle 102, notify the companion unmanned vehicles 102 of this change, and then execute the change. In some embodiments, depending on the spread of the unmanned vehicles 102, terrain data can indicate that some of the unmanned vehicles 102 need to modify their planned path for an obstacle, while other unmanned vehicles can continue to travel on their planned paths, if the obstacle is not in their way. Therefore, terrain data can be used by the unmanned vehicle 102 to calculate its future position, and the companion vehicle 102 can use this information to determine the current position of the unmanned vehicle 102 by various methods, including reverse extrapolation of the future position data of the unmanned vehicle 102 and the terrain data. The companion unmanned vehicle 102 can also use this information in conjunction with other data sources, such as GPS data, ranging tones etc.

In some other embodiments, the location unit 206 can use optical methods such as, but not restricted to, camera, stereoscopy, holography, and the like, to determine current position of the unmanned vehicle 102. Optical methods can be used in any number of ways, for example, cameras can be used by an operator of the unmanned vehicle 102 to remotely determine the current position of the unmanned vehicle 102. Alternatively, or additionally, stereoscopic or holographic data can be compared with the USGS terrain data to determine if the stereoscopic or holographical perceived differences in elevation match the known terrain features, elevations, etc. in order to synchronize the unmanned vehicle 102 relative to its environment. These methods can also be used to catalogue features which lack any terrain data, for example, in regions such as, but not restricted to, other countries which have terrain that are yet to be surveyed. Further, the unmanned vehicle 102 can also dynamically calculate flight paths based on the three-dimensional assessment provided by stereoscopic or holographic methods. For example, two or more unmanned vehicles may fly over an unknown terrain with appreciable separation to generate a 3-D terrain map. This map can then be utilized by the unmanned vehicles during a lower-altitude mission. The map can be then used in the calculation or re-calculation of planned paths.

In some embodiments, the communication unit 210 can be configured to transmit the planned path and the current position of the unmanned vehicle 102 to the base station 104 and/or the companion unmanned vehicles 102 of the system 100. In other embodiments, the communication unit 210 can transmit the planned path and the current position of the unmanned vehicle 102 to the base station 104 and/or the companion unmanned vehicles 102 through the communication network 106. The communication unit 210 can use communication methods that can include radio communications based on any frequency spectrum (e.g., Very High Frequency (VHF) or Ultra-High Frequency (UHF)) and any supporting infrastructure (e.g., satellites, cell phone towers, etc.). In fact, embodiments of the disclosed subject matter are intended to include or otherwise cover any type of techniques, including known, related art, and/or later developed technologies to transmit the planned path and the current position of the unmanned vehicle 102 to the base station 104 and/or the companion unmanned vehicles 102. Further, the planned path and the current position of the unmanned vehicle 102 can be generated in any format.

In some embodiments, the control unit 212 can be configured to control the movement of the unmanned vehicle 102 to impede or avoid potential collisions based on its relative position with respect to the companion unmanned vehicles 102. For example, if the unmanned vehicle 102 is a rotorcraft then the control unit 212 can be configured to control the movement of the rotorcraft by controlling the parameters such as, but not limited to, a pitch and speed of rotor blades of each rotor, angle between the rotors, and the like. If the unmanned vehicle 102 is a fixed-wing aircraft, then the control unit 212 can be configured to control the movement of the fixed-wing aircraft by controlling parameters, such as, but not limited to, thrust from a propeller, one or more parameters of flight control surfaces, and the like.

Though, in the description above, specific operations of the unmanned vehicle 102 has been explained in conjunction with individual components, in some embodiments, the controller 214 can perform one or more of the specific operations. In some embodiments, the controller 214 of the unmanned vehicle 102 can be configured to determine the current position of the unmanned vehicle 102 based on data received from the position unit 208. The communication unit 210 of the unmanned vehicle 102 can receive data from the companion unmanned vehicles 102 indicative of their respective current positions and planned paths. Thereafter, the controller 214 of the unmanned vehicle 102 can determine relative positions of all the companion unmanned vehicles 102 relative to the unmanned vehicle 102. In yet other embodiments, the controller 214 can be configured to estimate potential collisions for the unmanned vehicle 102 and the companion unmanned vehicles 102 based on its current position and/or its planned path. The controller 214 can also control the movement of the unmanned vehicle 102 based on the relative positions in order to impede or avoid collisions with the companion unmanned vehicles 102 and/or with obstacles.

In other embodiments, the controller 214 can be configured to retrieve terrain data indicative of the terrain ahead of one or more of the unmanned vehicles 102 of the system 100. The controller 214 can be further configured to determine a dynamic path of the one or more of the unmanned vehicles 102 based on at least the terrain data, the current position and planned paths of the one or more unmanned vehicles 102. Further, the controller 214 can be configured to control the movement of the one or more unmanned vehicles 102 based on the dynamic path. In an embodiment, the dynamic path data may be substantially similar to the planned path data. However, the dynamic path data is generated in real time during travel of the unmanned vehicle 102 instead of being predetermined prior to start of a mission.

However, in some other embodiments, the controller of the base station 104 can perform one or more of the above operations. Yet in some other embodiments, a controller 214 of the companion unmanned vehicle 102 can perform one or more of the above operation. In fact, embodiments of the disclosed subject matter are intended to include or otherwise cover any controller or processor that is operatively coupled to one or more of the unmanned vehicles 102 and can perform one or more of the above operations.

In some embodiments, the controller 214 of the companion unmanned vehicle 102 can be configured to control the movement of the unmanned vehicle 102 in order to impede or avoid potential collisions based on the planned path and current position received from the unmanned vehicle 102. The controller 214 of the companion unmanned vehicle 102 can be configured to determine the current position of the unmanned vehicle 102 by various methods, including, but not restricted to, a satellite navigation, relative vehicle telemetry, optical imaging, ranging tones, terrain data, and the like.

In some embodiments, the controller 214 of one of the unmanned vehicles 102 (for example, a leader unmanned vehicle 102) of the system 100 can determine the current positions of each of the unmanned vehicles 102 based on signals received from the other unmanned vehicles 102. Further, the controller 214 of the leader unmanned vehicle 102 can determine relative positions of the unmanned vehicles 102 with respect to each other based on the planned path and the current position of each of the unmanned vehicles 102. The controller 214 of the leader unmanned vehicle 102 can also remotely control its movement as well as movements of the other unmanned vehicles 102 based on the relative positions. The controller 214 of the leader unmanned vehicle 102 can also estimate one or more potential collisions between the unmanned vehicles 102 based on at least their relative positions. The controller 214 of the leader unmanned vehicle 102 can also retrieve terrain data indicative of a terrain ahead of the unmanned vehicles 102, determine a dynamic path for each of the unmanned vehicles 102 based on at least the terrain data, the current position and the planned path of each of the unmanned vehicles, and control the movement of each of the unmanned vehicles based on the dynamic path of the corresponding unmanned vehicles.

In some other embodiments, the controller at the base station 104 can determine the current position data and planned path data of the unmanned vehicle 102 and transmit it to the respective unmanned vehicle 102. Further, the controller at the base station 104 can transmit control signals to respective unmanned vehicles 102 such that the movements of the respective unmanned vehicles 102 can be controlled based on the received control signals from the base station 104.

In some embodiments, the controller 214 of the unmanned vehicle 102 performs various operations such as, but are not limited to, movement of the unmanned vehicle 102, controlling and coordinating operations of various components of the unmanned vehicle 102, interfacing with other unmanned vehicles 102 and processing information from the base station 104. However, in some other embodiments, the controller of the base station can perform one or more of the above operations. Yet in some other embodiments, the controller 214 of the companion unmanned vehicle 102 or the leader unmanned vehicle 102 can perform one or more of the above operations.

In fact, embodiments of the disclosed subject matter are intended to include or otherwise cover any type of techniques and/or systems of sharing the current position and planned path data among the unmanned vehicles 102 in a fleet, so that each of the unmanned vehicle 102 in the fleet can autonomously adjust its position to impede vehicle-to-vehicle and/or vehicle-to-obstacle collisions.

III. Operation of the Unmanned Vehicle

Figure 3:
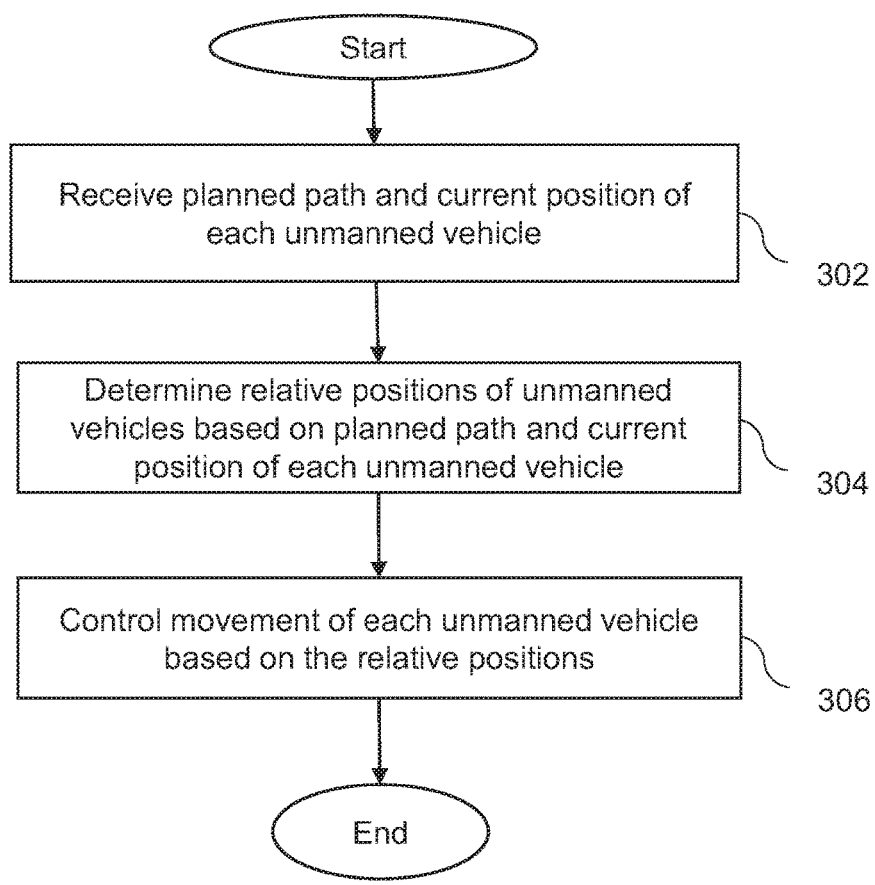
FIG. 3 is a method for controlling movement of unmanned vehicles in accordance with the disclosed subject matter.

FIG. 3 is a flowchart of a procedure 300 for controlling the unmanned vehicles 102 based on the current position and planned path of each unmanned vehicle 102 in accordance with the disclosed subject matter. This flowchart is merely provided for exemplary purposes, and embodiments are intended to include or otherwise cover any methods or procedures for controlling an unmanned vehicle.

In accordance with the flowchart of FIG. 3, at step 302, the controller 214 of the unmanned vehicle 102 receives its own planned path data and planned path data of each of the companion unmanned vehicles 102. At step 302, the controller 214 may also receive the current position of the companion unmanned vehicles 102. The controller 214 may receive the planned path data from the base station 104 or one of the other unmanned vehicles 102 at step 302. In some embodiments, the unmanned vehicle 102 may use various methods including, but not restricted to, ad-hoc peer-to-peer communication, vehicle telemetry, and the like to receive the planned path data and the current position data.

The planned path of each unmanned vehicle 102 includes the speed profile of the path, the altitude profile of the path and the horizontal profile of the path. Further, the controller 214 of the unmanned vehicle 102 may further determine its own current position. The current position data may include, but not restricted to the current heading or orientation, the current speed, the current location (latitude and longitude), and the current altitude. In alternate embodiments, the position data may include any other information that is required to determine the position of the unmanned vehicle 102. The controller 214 may use various methods, such as, but not restricted to, satellite navigation, inertial navigation, USGS terrain data, ranging tones, relative vehicle telemetry, optical imaging, or a combination thereof. In fact, embodiments of the disclose subject matter are intended to include or otherwise cover any type of techniques and/or systems to determine the current position data of the unmanned vehicle 102.

Alternatively, the controller 214 of the unmanned vehicle 102 may receive its own current position from the base station 104 or one or the companion unmanned vehicles 102.

Next, at step 304, the controller 214 determines the relative positions of the unmanned vehicles 102 with respect to each other based on the planned paths and the current positions of the unmanned vehicles 102. The controller 214 can determine the relative positions of the unmanned vehicles 102 by calculating the distances between the unmanned vehicles 102, relative headings or orientations of the unmanned vehicles 102, speed of each of the unmanned vehicles 102. As such, the relative positions of the unmanned vehicles 102 include relative distances between the unmanned vehicles 102 and relative orientations between the unmanned vehicles 102. Further, the controller 214 may transmit the relative positions of the unmanned vehicles 102 to the base station 104.

At step 306, the controller 214 controls the movement of each of the unmanned vehicles 102 based on at the relative positions of the unmanned vehicles 102. In some embodiments, the controller 214 can further estimate one or more potential collisions between the unmanned vehicles 102 based on at least the relative positions of the unmanned vehicles 102. The controller 214 may then control the movement of the unmanned vehicles in order to impede or avoid the one or more potential collisions.

In other embodiments, the procedure 300 can include detecting an obstacle via at least one of the unmanned vehicles 102. The controller 214 may then estimate potential collisions of one or more unmanned vehicles 102 with the obstacle based at least the current position and the planned path of each of the unmanned vehicles 102. The controller 2214 may further control the movement of each of the unmanned vehicles 102 in order to impede or avoid the potential collisions.

In yet other embodiments, the procedure 300 can also include receiving, at the controller 214, terrain data indicative of the terrain ahead of the unmanned vehicles. The controller 214 may can then determine a dynamic path of each of the unmanned vehicles 102 based on at least the terrain data, and the current position and the planned path of each of the unmanned vehicles 102.

Though the various steps of the procedure 300, as described above, have been implemented by the controller 214 of one of the unmanned vehicles 102, it may be contemplated that the controller of the base station 104 or the controller 214 of the leader unmanned vehicle 102 may perform one or more of the above steps.

Figure 4:
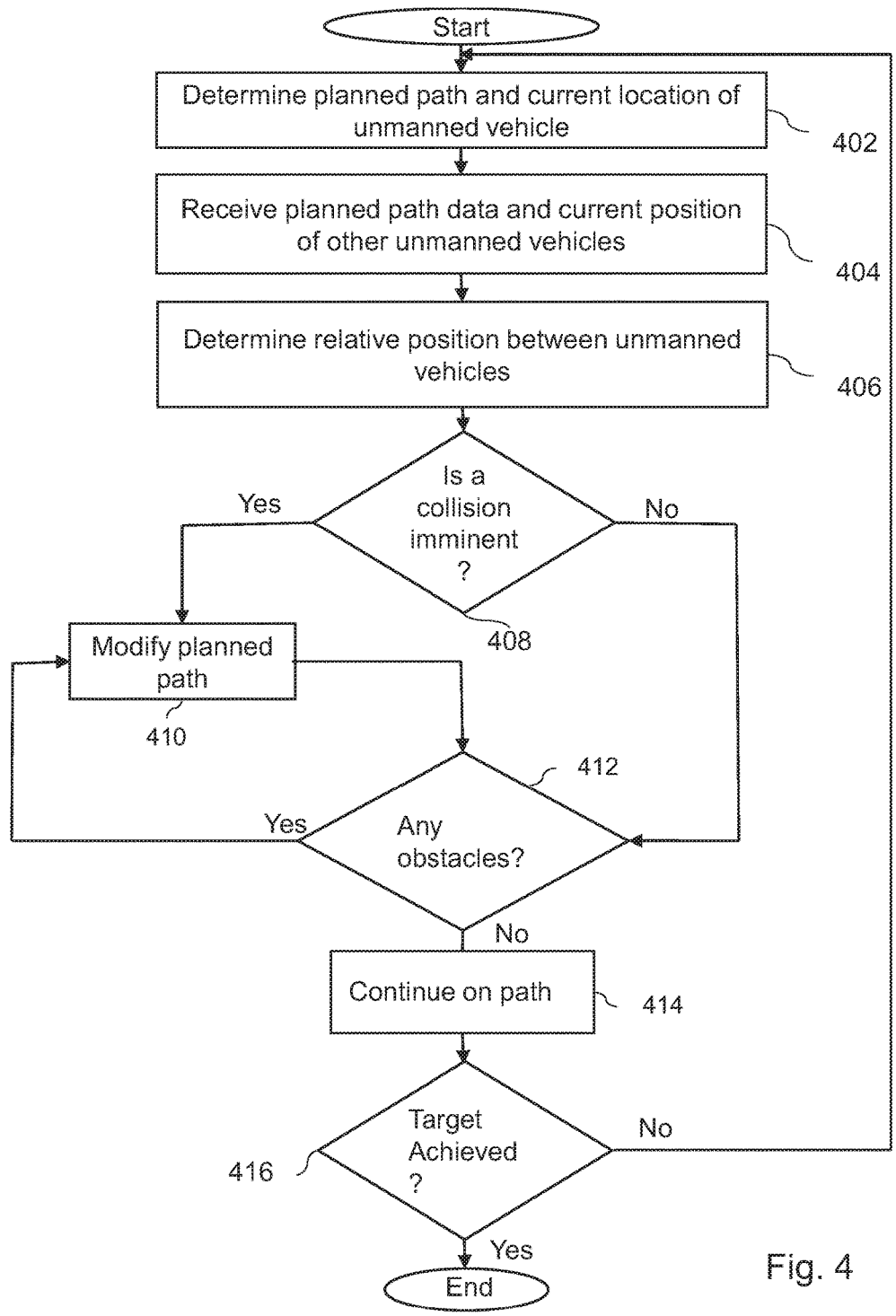
FIG. 4 is a method for controlling movement of unmanned vehicles in accordance with the disclosed subject matter.

FIG. 4 is a flowchart of a procedure 400 for controlling the unmanned vehicle 102 and to determine positional information of unmanned or optionally manned vehicles by using an unmanned vehicle 102 in accordance with the disclosed subject matter. This flowchart is merely provided for exemplary purposes, and embodiments are intended to include or otherwise cover any methods or procedures for controlling an unmanned vehicle.

In accordance with the flowchart of FIG. 4, at step 402, the unmanned vehicle 102 determines its planned path from the data received from the base station 104 and determines its current position data. As discussed, the position data may include, but not restricted to, heading or orientation, latitude, longitude, and altitude. In alternate embodiments, the position data may include any other information that is required to determine the position of the unmanned vehicle 102.

At step 404, the unmanned vehicle 102 receives the planned path data and current position data of companion unmanned vehicles 102 from the base station 104 or directly from the companion unmanned vehicles 102. At step 406, the unmanned vehicle 102 determines relative positions of all the unmanned vehicle 102 of the system 100 with respect to each other based on the planned path data and the current position data.

Further, at step 408, the unmanned vehicle 102 determines whether one or more collisions between the unmanned vehicles 102 are imminent, based on the relative positions. In case the unmanned vehicle 102 determines that one or more collisions between the unmanned vehicles 102 are imminent, then the procedure 400 proceeds to step 410 which involves modification of the planned paths of the concerned unmanned vehicles 102. In various embodiments, each of the unmanned vehicles 102 can modify its own planned path, if necessary, in order to avoid or impede the one or more vehicle to vehicle collisions. Modification of path may include deviating from the planned path for a time period and subsequently travelling on the planned path after the collisions have been averted. Alternatively, one or more of the unmanned vehicles 102 may re-calculate a new planned path or determine a dynamic path in order to impede or avoid collisions.

In case the unmanned vehicle 102 determines that there is no possibility of collisions between the unmanned vehicle 102, then the procedure 400 proceeds to step 412 and each of the unmanned vehicles 102 continue following their respective planned paths.

Next, at the step 412, the unmanned vehicle 102 determines whether an obstacle is present in the vicinity. In case an obstacle is present in path of the unmanned vehicle 102, then the procedure 400 returns to step 410 where the unmanned vehicles 102 modify their respective paths, if necessary, to impede or avoid collisions with the obstacle. In case the unmanned vehicle 102 does not detect any obstacle, then the procedure 400 moves to step 414 where the unmanned vehicles 102 continue on their respective planned paths to achieve the target.

At step 416, the unmanned vehicle 102 determines if a target or mission objective is achieved. In case the target or the mission objective is achieved, then the procedure 400 returns to step 402 and repeats all steps from 402 to 416. However, in case the target is achieved, the procedure 400 ends.

IV. Exemplary Embodiments

FIG. 5A illustrates an exemplary scenario illustrating a system 500 of unmanned vehicles 102a to 102n travelling on their respective planned paths 502a to 502n in accordance with the disclosed subject matter. In FIG. 5A, the unmanned vehicles 102 to 102n are travelling from a starting position, illustrated as position A, to a destination, illustrated as position B. The planned paths 502a to 502n have been generated keeping in mind mission objectives and prevention of any collisions or close encounters. Further, the planned paths 502a to 502n may be generated such that the system 500 of unmanned vehicles 102a to 102n follow an energy efficient flying formation, such as a V-formation.

Figure 5B:
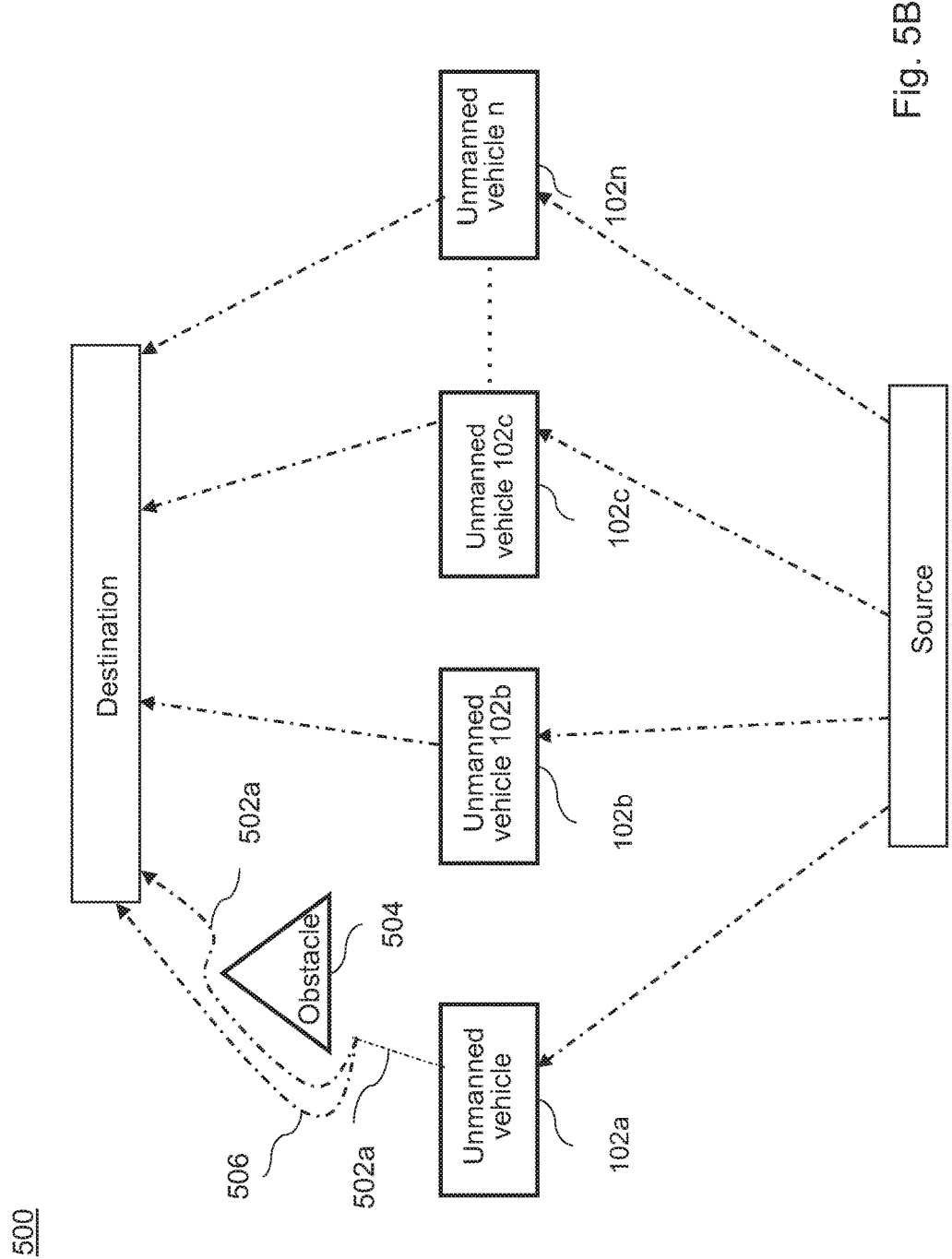
FIG. 5B is a schematic of unmanned vehicles encountering an obstacle in accordance with disclosed subject matter.

Further, FIG. 5B illustrates the unmanned vehicle 102a detecting an obstacle 504 in its planned path 502a. The unmanned vehicle 102 can use various methods to detect the obstacle 504, for example, optical imaging, proximity sensors, and the like. In an embodiment, the unmanned vehicle 102a determines presence of the obstacle 504 from sensor data generated by the detection unit 202 (shown in FIG. 2). As shown, upon detecting the obstacle 504 in the planned path 502a, the unmanned vehicle 102a deviates from its planned path 502a in order to avoid any collision with the obstacle 504. The unmanned vehicle 102a may also communicate a position of the obstacle 504 with respect to itself and its current position to the companion unmanned vehicles 102b to 102n. In other embodiments, the unmanned vehicles 102a may use the base station 104 or another unmanned vehicle as a relay for exchanging various data including current positions, planned paths and obstacle positions.

Each of the companion unmanned vehicles 102b to 102n may determine relative position of the unmanned vehicle 102a based on the current position of the unmanned vehicle 102a and respective planned paths 502b to 502n. Further, each of the companion unmanned vehicles 102b to 102n may further determine relative distances between the obstacle 504 and themselves based on the position of the obstacle 504 received from the unmanned vehicle 102a and the current position of the unmanned vehicle 102a. The companion unmanned vehicles 102b to 102n may then modify their paths, if necessary, to avoid collisions with the obstacle 504. In case the obstacle 504 is mobile (e.g., a bird), the unmanned vehicle 102a can continue tracking the obstacle 504 and relaying the real time position of the obstacle 504 to the companion unmanned vehicles 102b and 102n which in turn may update relative positional data of the obstacle 504 and take evasive actions, if necessary.

Moreover, the unmanned vehicle 102a may move back to the planned path 502a after avoiding the obstacle 504. Alternatively, the unmanned vehicle 102a may re-calculate a new planned path 506 for itself and communicate the new planned path 506 to the companion unmanned vehicles 102b to 102n. The companion unmanned vehicles 102b to 102n may modify their respective planned paths 502b to 502n accordingly to avoid any vehicle-to-vehicle collisions.

V. Other Exemplary Embodiments

FIG. 5C illustrates the system 500 including the unmanned vehicles 102a to 102n where the unmanned vehicle 102a has veered off course. The unmanned vehicle 102a can deviate from its planned path 502a due to various environmental factors, such as, but not restricted to, rain, storm, unpredictable wind patterns, and the like. Moreover, the unmanned vehicle 102a may also deviate from its planned path 502a due to any hardware or software faults. As shown in FIG. 5C, a deviated path 508 of the unmanned vehicle 102a may intersect the planned path 502b of the companion unmanned vehicle 102b. In other examples (not shown), the deviated path 508 may also intersect with the planned paths of multiple unmanned vehicles. Therefore, if the unmanned vehicle 102a continues to travel on the deviated path 508, there may be a possible collision between the unmanned vehicles 102a and 102b.

To impede or avoid such collisions, the unmanned vehicle 102a may transmit its current position and planned path data to the companion unmanned vehicles 102b to 102n. The unmanned vehicles 102b may then determine the deviated path 508 of the unmanned vehicle 102a based on its current position and compare the deviated path 508 with its own planned path 502b. Based on the comparison between the deviated path 508 and the planned path 502b, the unmanned vehicle 102b may determine that there is a possibility of a collision with the unmanned vehicle 102a. Thereafter, the unmanned vehicle 102b may modify its path in order to impede or avoid the collision with the unmanned vehicle 102a. Further, the unmanned vehicle 102b may also transmit information regarding the impending collision to the unmanned vehicle 102a. The unmanned vehicle 102a may then correct its course and return to its planned path 502a or recalculate a new planned path to avoid any vehicle to vehicle collisions.

It may be contemplated that the above calculations and exchange of current position data and planned path data occur iteratively in order to correct the trajectories of all the unmanned vehicles 102a to 102n in the system 500 in order to impede or avoid collisions while meeting mission objectives.

In other embodiments, the unmanned vehicle 102b may detect a sudden change in trajectory of the unmanned vehicle 102a leading to a close encounter between the unmanned vehicles 102a and 102b. For example, the unmanned vehicle 102b may receive the current position of the unmanned vehicle 102a and determine that a relative distance between them is below a safe threshold. The unmanned vehicle 102b may then execute an avoidance maneuver to increase the distance above the safe threshold. Further, the unmanned vehicle 102b can communicate the close encounter scenario to the unmanned vehicle 102a so that the unmanned vehicle 102a may perform a similar avoidance maneuver. Once the distance between the unmanned vehicles 102a and 102b increased beyond the safe threshold, the unmanned vehicles 102a and 102b may either move back to their respective planned paths 502a and 502b, respectively, or re-calculate new planned paths. Moreover, such avoidance maneuvers may be executed in an iterative manner to impede or avoid any collisions and close encounters.

The exemplary scenario, as described above in conjunction with FIGS. 5A to 5C, are for illustrative purposes only and many alternative scenarios are possible without deviating from the scope of the disclosed subject matter. In fact, embodiments are intended to include or other cover various strategies of autonomous coordination among the unmanned vehicles 102a and 102b based on exchanged current position and planned path data in order to impede or avoid vehicle to vehicle collisions and/or collisions with obstacles.

VI. Exemplary Computer System

Figure 6:
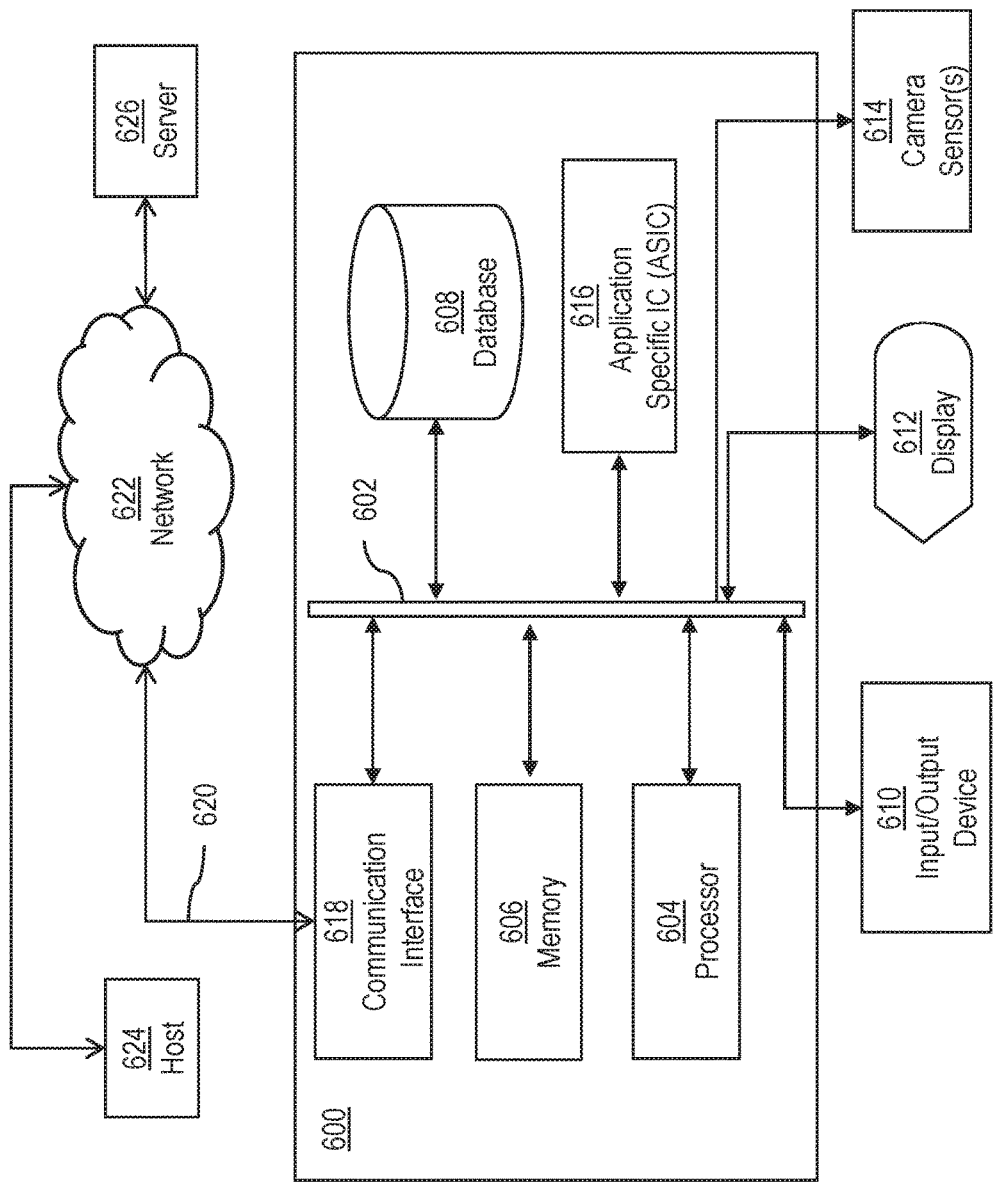
FIG. 6 is a computer system that can be used to implement various exemplary embodiments of the disclosed subject matter.

FIG. 6 illustrates a computer system 600 upon which an embodiment of the invention may be implemented. The computer system 600 may be part of the controller 214, the control unit 212 and/or the controller of the base station 104. In fact, the computer system 600 can be part of any component of the unmanned vehicle 102. Although, the computer system 600 is depicted with respect to a particular device or equipment, it is contemplated that other devices or equipment (e.g., network elements, servers, etc.) within FIG. 6 can deploy the illustrated hardware and components of the system 600. The computer system 600 is programmed (e.g., via computer program code or instructions) to control the unmanned vehicles 102 and includes a communication mechanism such as a bus 602 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0,1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. The computer system 600, or a portion thereof, constitutes a means for performing one or more steps for controlling one or more unmanned vehicles 102 to impede collisions.

A bus 602 includes one or more parallel conductors of information so that information is transferred quickly among devices coupled to the bus 602. One or more processors 604 for processing information are coupled with the bus 602.

The processor (or multiple processors) 604 performs a set of operations on information as specified by computer program code related to controlling one or more unmanned vehicles 102. The computer program code is a set of instructions or statements providing instructions for the operation of the processor 604 and/or the computer system 600 to perform specified functions. The code, for example, may be written in a computer programming language that is compiled into a native instruction set of the processor 604. The code may also be written directly using the native instruction set (e.g., machine language). The set of operations include bringing information in from the bus 602 and placing information on the bus 602. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 604, such as a sequence of operation codes, constitute processor instructions, also called computer system instructions or, simply, computer instructions. The processors 604 may be implemented as mechanical, electrical, magnetic, optical, chemical, or quantum components, among others, alone or in combination.

The computer system 600 also includes a memory 606 coupled to the bus 602. The memory 606, such as a Random Access Memory (RAM) or any other dynamic storage device, stores information including processor instructions for storing information and instructions to be executed by the processor 604. The dynamic memory 606 allows information stored therein to be changed by the computer system 600. RAM allows a unit of information stored at a location called a memory address to be stored and retrieved independently of information at neighboring addresses. The memory 606 is also used by the processor 604 to store temporary values during execution of processor instructions. The computer system 600 also includes a Read Only Memory (ROM) or any other static storage device coupled to the bus 602 for storing static information, including instructions, that is not changed by the computer system

600. Some memory is composed of volatile storage that loses the information stored thereon when power is lost. Also coupled to the bus 602 is a non-volatile (persistent) storage device 608, such as a magnetic disk, a solid state disk, optical disk or flash card, for storing information, including instructions, that persists even when the computer system 600 is turned off or otherwise loses power.

Information, including instructions for controlling one or more unmanned vehicles 102 is provided to the bus 602 for use by the processor 604 from an external input device 610, such as a keyboard containing alphanumeric keys operated by a human user, a microphone, an Infrared (IR) remote control, a joystick, a game pad, a stylus pen, a touch screen, or a sensor. The sensor detects conditions in its vicinity and transforms those detections into physical expression compatible with the measurable phenomenon used to represent information in the computer system 600. Other external devices coupled to the bus 602, used primarily for interacting with humans, include a display 612, such as a Cathode Ray Tube (CRT), a Liquid Crystal Display (LCD), a Light Emitting Diode (LED) display, an organic LED (OLED) display, active matrix display, Electrophoretic Display (EPD), a plasma screen, or a printer for presenting text or images, and a pointing device 616, such as a mouse, a trackball, cursor direction keys, or a motion sensor, for controlling a position of a small cursor image presented on the display 612 and issuing commands associated with graphical elements presented on the display 612, and one or more camera sensors 614 for capturing, recording and causing to store one or more still and/or moving images (e.g., videos, movies, etc.) which also may comprise audio recordings. Further, the display 612 may be a touch enabled display such as capacitive or resistive screen. In some embodiments, for example, in embodiments in which the computer system 600 performs all functions automatically without human input, one or more of the external input device 610, and the display device 612 may be omitted.

In the illustrated embodiment, special purpose hardware, such as an ASIC 616, is coupled to the bus 602. The special purpose hardware is configured to perform operations not performed by the processor 604 quickly enough for special purposes. Examples of ASICs include graphics accelerator cards for generating images for the display 612, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 600 also includes one or more instances of a communication interface 618 coupled to the bus 602. The communication interface 618 provides a one-way or two-way communication coupling to a variety of external devices that operate with their own processors, such as printers, scanners and external disks. In general, the coupling is with a network link 620 that is connected to a local network 622 to which a variety of external devices with their own processors are connected. For example, the communication interface 618 may be a parallel port or a serial port or a Universal Serial Bus (USB) port on a personal computer. In some embodiments, the communication interface 618 is an Integrated Services Digital Network (ISDN) card, a Digital Subscriber Line (DSL) card, or a telephone modem that provides an information communication connection to a corresponding type of a telephone line. In some embodiments, the communication interface 618 is a cable modem that converts signals on the bus 602 into signals for a communication connection over a coaxial cable or into optical signals for a communication connection over a fiber optic cable. As another example, the communications interface 618 may be a Local Area Network (LAN) card to provide a data communication connection to a compatible LAN, such as Ethernet or an Asynchronous Transfer Mode (ATM) network. In one embodiment, wireless links may also be implemented. For wireless links, the communication interface 618 sends or receives or both sends and receives electrical, acoustic or electromagnetic signals, including infrared and optical signals that carry information streams, such as digital data. For example, in wireless handheld devices, such as mobile telephones like cell phones, the communication interface 618 includes a radio band electromagnetic transmitter and receiver called a radio transceiver. In certain embodiments, the communication interface 618 enables connection to the communication network 106 for controlling one or more unmanned vehicles 102. Further, the communication interface 618 can include peripheral interface devices, such as a thunderbolt interface, a Personal Computer Memory Card International Association (PCMCIA) interface, etc. Although a single communication interface 618 is depicted, multiple communication interfaces can also be employed.

The term "computer-readable medium" as used herein refers to any medium that participates in providing information to the processor 604, including instructions for execution. Such a medium may take many forms, including, but not limited to, computer-readable storage medium (e.g., non-volatile media, volatile media), and transmission media. Non-transitory media, such as non-volatile media, include, for example, optical or magnetic disks, such as the storage device 608. Volatile media include, for example, the dynamic memory 606. Transmission media include, for example, twisted pair cables, coaxial cables, copper wire, fiber optic cables, and carrier waves that travel through space without wires or cables, such as acoustic waves, optical or electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a USB flash drive, a Blu-ray disk, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 616.

The network link 620 typically provides information communication using transmission media through one or more networks to other devices that use or process the information. For example, the network link 620 may provide a connection through the local network 622 to a host computer 624 or to ISP equipment operated by an Internet Service Provider (ISP).

A computer called a server host 626, connected to the Internet, hosts a process that provides a service in response to information received over the Internet. For example, the server hosts 626 hosts a process that provides information representing video data for presentation at the display 612. It is contemplated that the components of the computer system 600 can be deployed in various configurations within other computer systems, e.g., the host 624 and the server 626.

At least some embodiments of the invention are related to the use of the computer system 600 for implementing some or all of the techniques described herein. According to one embodiment of the invention, those techniques are performed by the computer system 600 in response to the processor 604 executing one or more sequences of one or more processor instructions contained in the memory 606. Such instructions, also called computer instructions, software and program code, may be read into the memory 606 from another computer-readable medium such as the storage device 608 or the network link 620. Execution of the sequences of instructions contained in the memory 606 causes the processor 604 to perform one or more of the method steps described herein. In alternative embodiments, hardware, such as the ASIC 616, may be used in place of or in combination with software to implement the invention. Thus, embodiments of the invention are not limited to any specific combination of hardware and software, unless otherwise explicitly stated herein.

Various forms of computer readable media may be involved in carrying one or more sequence of instructions or data or both to the processor 604 for execution. For example, instructions and data may initially be carried on a magnetic disk of a remote computer such as the host 624. The remote computer loads the instructions and data into its dynamic memory 606 and sends the instructions and data over a telephone line using a modem. A modem local to the computer system 600 receives the instructions and data on a telephone line and uses an infra-red transmitter to convert the instructions and data to a signal on an infra-red carrier wave serving as the network link 620. An infrared detector serving as the communication interface 618 receives the instructions and data carried in the infrared signal and places information representing the instructions and data onto the bus 602. The bus 602 carries the information to the memory 606 from which the processor 604 retrieves and executes the instructions using some of the data sent with the instructions. The instructions and data received in the memory 606 may optionally be stored on the storage device 608, either before or after execution by the processor 604.

VII. Alternative Embodiments

While certain embodiments of the invention are described above, and FIGS. 1-6 disclose the best mode for practicing the various inventive aspects, it should be understood that the invention can be embodied and configured in many different ways without departing from the spirit and scope of the invention.

For example, embodiments are disclosed above in the context of an unmanned vehicle. However, embodiments are intended to include or otherwise cover any type of unmanned vehicle or an optionally manned vehicle, including, an unmanned or optionally manned aerial vehicle, an unmanned or optionally manned terrestrial vehicle (for example, a car), an unmanned or optionally manned aquatic vehicle, an unmanned or optionally manned railed vehicles, an unmanned or optionally manned spacecraft, a drone, a gyrocopter etc. In fact, embodiments are intended to include or otherwise cover any configuration of an unmanned vehicle or an optionally manned vehicle.

Exemplary embodiments are also intended to cover any additional or alternative components of the unmanned vehicle disclosed above. Exemplary embodiments are further intended to cover omission of any component of the unmanned vehicle disclosed above.

Embodiments are disclosed above in the context of controlling an unmanned vehicle or an optionally manned vehicle in order to impede or avoid collisions between the unmanned vehicle or the optionally manned vehicle, and a companion vehicle.

Embodiments are disclosed above in the context of controlling an unmanned vehicle or an optionally manned vehicle in order to impede or avoid collisions between the unmanned vehicle or the optionally manned vehicle, and an obstacle. Embodiments are intended to cover any obstacle, such as, but not restricted to, trees, hills, mountains, buildings, towers, corals, waterbodies, sand banks, orbital debris and so forth. Embodiments are also intended to cover any movable obstacle, such as, but not restricted to, birds, aircraft, watercraft, spacecraft, terrestrial vehicles, and so forth.

Exemplary embodiments are also intended to include and/or otherwise cover a V-formation of the unmanned vehicle swarm or a fleet of unmanned vehicles, which can cause each of the unmanned vehicles to be well separated. The separation of the unmanned vehicles can allow each of the unmanned vehicles to individually receive current position and planned path data, and mutually modify their trajectories to impede collisions. However, embodiments of the disclosed subject matter are intended to include or otherwise cover any type of formation that may be beneficial.

Embodiments are intended to cover fleets of unmanned vehicles, fleets of optionally manned vehicles, or fleets having both unmanned vehicles and optionally manned vehicles. Embodiments are also intended to include or otherwise cover methods or techniques of sharing current position and planned path among unmanned vehicles and/or optionally manned vehicles in a fleet, so that each of the unmanned vehicles or optionally manned vehicles in the fleet can autonomously adjust their positions to impede or avoid vehicle-to-vehicle and/or vehicle-to-obstacle collision.

Embodiments are also intended to include or otherwise cover methods of manufacturing the unmanned vehicle disclosed above. The methods of manufacturing include or otherwise cover processors and computer programs implemented by processors used to design various elements of the unmanned vehicle disclosed above.

Exemplary embodiments are intended to cover all software or computer programs capable of enabling processors to implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations of airbag housing assemblies disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A method of controlling a plurality of unmanned vehicles, each of the plurality of unmanned vehicles including and being operatively coupled to a respective controller, the method comprising:
communicating, by a communication unit, with an other unmanned vehicle of the plurality of unmanned vehicles, independent of a specific one of the plurality of the unmanned vehicles being a primary said unmanned vehicle to communicate and control the other of the unmanned vehicles;
receiving, at the respective controller, and sharing a planned path of each of the plurality of unmanned vehicles, and sharing a current position of each of the plurality of unmanned vehicles for enhanced estimation of distances among the plurality of unmanned vehicles,
the controller of each of the plurality of unmanned vehicles performing a communicating, controlling various operations, including coordinating movement, and interfacing with other unmanned vehicle of the plurality of unmanned vehicles;
determining, by each controller, relative positions of the plurality of unmanned vehicles with respect to each other based on the planned path and the current position of each of the plurality of unmanned vehicles; and
controlling, by each controller, a movement of each of the plurality of unmanned vehicles based on at least the relative positions of the plurality of unmanned vehicles;
detecting, via at least one unmanned vehicle, an obstacle;
estimating, by each controller, potential collisions of at least one of the plurality of unmanned vehicles with the obstacle based on at least the current position and the planned path of each of the plurality of unmanned vehicles;
controlling, by each controller, the movement of each of the plurality of unmanned vehicles in order to impede the potential collisions; and
informing a neighboring unmanned vehicle of the plurality of unmanned vehicles about a speed profile of the path, an altitude profile of the path, horizontal profile of the path, and a fully calculated path trajectory,
wherein the controlling is performed at least independent of a base station controller.

2. The method of claim 1, wherein the planned path comprises a speed profile of the path, an altitude profile of the path and a horizontal profile of the path.

3. The method of claim 1, wherein the current position comprises a current location, a current altitude, a current speed and a current heading of each of the plurality of unmanned vehicles.

4. The method of claim 1, wherein relative positions of the plurality of unmanned vehicles comprise relative distances between the plurality of unmanned vehicles and relative orientations between the plurality of unmanned vehicles.

5. The method of claim 1, further comprising:
estimating, by the controller, one or more potential collisions between the plurality of unmanned vehicles based on at least the relative positions of the plurality of unmanned vehicles; and
controlling, by the controller, the movement of each of the plurality of unmanned vehicles in order to impede the one or more potential collisions.

6. The method of claim 1, further comprising determining, by the controller, the current position of each of the plurality of unmanned vehicles by at least one of satellite navigation, relative vehicle telemetry, optical imaging, and ranging tones.

7. The method of claim 1, further comprising:
receiving, at the controller, terrain data indicative of a terrain ahead of the plurality of unmanned vehicles;
determining, by the controller, a dynamic path of each of the plurality of unmanned vehicles based on at least the terrain data, and the current position and the planned path of each of the plurality of unmanned vehicles; and
controlling, by the controller, the movement of each of the plurality of unmanned vehicles based on the dynamic path of the corresponding unmanned vehicles.

8. An unmanned vehicle for use with a companion unmanned vehicle, the companion unmanned vehicle including an unmanned second controller, the unmanned vehicle comprising:
a first controller that is different from the second controller located on the unmanned vehicle, the first controller including the same structure components as the unmanned second controller, wherein the first controller includes a location unit, a path planning unit, a communication unit, a position unit, a control unit and the detection unit, wherein the first controller and said unmanned second controller are configured to communicate, control various operations, including coordinating movement, and interface with each other independent of a specific one of the unmanned vehicles and the companion unmanned vehicle being a primary vehicle to communicate and control with the other unmanned vehicle,
wherein the location unit includes at least one of a satellite navigation module, a camera, an inertial navigation unit, accelerometers and gyroscopes, configured to determine a current position of the unmanned vehicle,
wherein the path planning unit is configured to generate a planned path of the unmanned vehicle,
wherein the communication unit includes at least one of a VHF radio, UHF radio and satellite communication radio configured to wirelessly communicate with the companion unmanned vehicle, the communication unit further configured to receive and share a planned path of the companion unmanned vehicle and a current position of the companion unmanned vehicle for enhanced estimation of distances between the two unmanned vehicles,
wherein the position unit includes at least one of ranging tones, and point-to-point communication technology configured to determine a relative position between the unmanned vehicle and the companion unmanned vehicle based on at least the planned path of the unmanned vehicle, the planned path of the companion unmanned vehicle, the current position of the unmanned vehicle and the current position of the companion unmanned vehicle,
wherein the control unit is configured to control a movement of the unmanned vehicle based on at least the relative position between the unmanned vehicle and the companion unmanned vehicle,
wherein the detection unit includes at least one of an imaging unit, an infrared detector, RADAR, an object sensor and a proximity sensor configured to detect an obstacle,
wherein the position unit is further configured to estimate a potential collision of the obstacle with at least one of the unmanned vehicle and the companion unmanned based on the current position and the planned path of each of the unmanned vehicles and the companion unmanned vehicle, wherein the control unit is further configured to control the movement of the unmanned vehicle in order to impede the potential collision, and wherein the planned path includes a speed profile of the path, an altitude profile of the path, horizontal profile of the path, and a fully calculated path trajectory.

9. The unmanned vehicle of claim 8, wherein a plurality of unmanned vehicles is comprised of the unmanned vehicle and the companion unmanned vehicle, and wherein the current position comprises a current location, a current altitude, a current speed and a current heading of each of the plurality of unmanned vehicles.

10. The unmanned vehicle of claim 8, wherein a plurality of unmanned vehicles is comprised of the unmanned vehicle and the companion unmanned vehicle, and wherein relative positions of the plurality of unmanned vehicles comprise relative distances between the plurality of unmanned vehicles and relative orientations between the plurality of unmanned vehicles.

11. The unmanned vehicle of claim 8, wherein the position unit is further configured to estimate a potential collision between the unmanned vehicle and the companion unmanned vehicle based on the relative position, and wherein the control unit is further configured to control the movement of the unmanned vehicle in order to impede the potential collision.

12. The unmanned vehicle of claim 8, wherein a plurality of unmanned vehicles is comprised of the unmanned vehicle and the companion unmanned vehicle, and wherein the location unit is configured to determine the current position of each of the plurality of unmanned vehicles by at least one of satellite navigation, relative vehicle telemetry, optical imaging, and ranging tones.

13. The unmanned vehicle of claim 8, wherein the unmanned vehicle is at least one of an unmanned aerial vehicle, an unmanned terrestrial vehicle, an unmanned aquatic vehicle, an unmanned space vehicle and an optionally manned vehicle.

14. The unmanned vehicle of claim 8, wherein the position unit and the location unit use point-to-point communication of send and/or receive, directly, information to and/or from the companion unmanned vehicle absent an intermediary.

15. A system, comprising:
a plurality of unmanned vehicles spaced from each other, each of the plurality of unmanned vehicles including:
a location unit that includes at least one of a satellite navigation module, a camera, an inertial navigation unit, accelerometers and gyroscopes, configured to determine a current position of the unmanned vehicle; and
a path planning unit that is connected to the location unit and is configured to generate a planned path of the unmanned vehicle; and
a controller that is connected to the location unit and the path planning unit and is disposed in communication with the plurality of unmanned vehicles, the controller configured to:

receive and share the planned path of each of the plurality of unmanned vehicles and the current position of each of the plurality of unmanned vehicles for enhanced estimation of distances among the plurality of unmanned vehicles;
determine relative positions of the plurality of unmanned vehicles with respect to each other based on the planned path and the current position of each of the plurality of unmanned vehicles; and
control a movement of the corresponding unmanned vehicle based at least on the relative positions of the unmanned vehicles, where:
the controller of each of the plurality of unmanned vehicles communicating, controlling various operations, including coordinating movement, and interfacing with other of the unmanned vehicles of the plurality of unmanned vehicles independent of a specific one of the plurality of the unmanned vehicles being a primary unmanned vehicle to communicate and control the other of the unmanned vehicles,
the controller includes a location unit, a path planning unit, a communication unit, a position unit, a control unit and the detection unit,
the detection unit includes at least one of an imaging unit, an infrared detector, RADAR, an object sensor and a proximity sensor configured to detect an obstacle,
the position unit is further configured to estimate a potential collision of the obstacle with at least one of the plurality of the unmanned vehicle based on the current position and the planned path of each of the plurality of unmanned vehicles, and
the control unit is further configured to control the movement of the unmanned vehicle in order to impede the potential collision,
wherein the planned path includes a speed profile of the path, an altitude profile of the path, horizontal profile of the path, and a fully calculated path trajectory.

16. The system of claim 15, wherein the controller is further configured to:
estimate at least one potential collisions between the plurality of unmanned vehicles based on at least the relative positions of the plurality of unmanned vehicles; and
control the movement of the corresponding unmanned vehicle in order to impede the potential collisions.

17. The system of claim 15, wherein the location unit of each of the plurality of unmanned vehicles is configured to determine the current position of each of the plurality of unmanned vehicles by at least one of satellite navigation, relative vehicle telemetry, optical imaging, and ranging tones.

18. The system of claim 15, wherein the controller is further configured to:
retrieve terrain data indicative of a terrain ahead of the plurality of unmanned vehicles;
determine a dynamic path for each of the plurality of unmanned vehicles based on at least the terrain data, and the current position and the planned path of each of the plurality of unmanned vehicles; and
control the movement of the each of the plurality of unmanned vehicles based on the dynamic path of the corresponding unmanned vehicles.

* * * * *